US009647282B2

(12) United States Patent
Furusawa et al.

(10) Patent No.: US 9,647,282 B2
(45) Date of Patent: May 9, 2017

(54) METHOD FOR CONTROLLING FUEL CELL SYSTEM

(71) Applicant: HONDA MOTOR CO., LTD., Tokyo (JP)

(72) Inventors: Koichiro Furusawa, Tochigi (JP); Kaoru Yamazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 549 days.

(21) Appl. No.: 14/147,659

(22) Filed: Jan. 6, 2014

(65) Prior Publication Data

US 2014/0212779 A1 Jul. 31, 2014

(30) Foreign Application Priority Data

Jan. 25, 2013 (JP) ................. 2013-012447

(51) Int. Cl.
*H01M 8/04* (2016.01)
*H01M 8/04082* (2016.01)
(Continued)

(52) U.S. Cl.
CPC ... *H01M 8/04261* (2013.01); *H01M 8/04197* (2016.02); *H01M 8/0447* (2013.01); *H01M 8/04082* (2013.01); *H01M 8/04097* (2013.01); *H01M 8/04104* (2013.01); *H01M 8/04223* (2013.01); *H01M 8/04225* (2016.02); (Continued)

(58) Field of Classification Search
CPC ............... H01M 8/04; H01M 8/04261; H01M 8/04197; H01M 8/04097; H01M 8/04753; H01M 8/04619; H01M 2250/20; H01M 8/04223; H01M 8/04104; H01M 8/04955; H01M 8/04225; H01M 8/04302; H01M 8/04328
See application file for complete search history.

(56) References Cited

U.S. PATENT DOCUMENTS

2009/0035630 A1* 2/2009 Kumada ........... H01M 8/04238
429/430
2011/0076580 A1 3/2011 Shimoi et al.
(Continued)

FOREIGN PATENT DOCUMENTS

DE    10 2010 053 628 A1    6/2011
JP         2003-115317 A    4/2003
(Continued)

OTHER PUBLICATIONS

JP 2003115317 MT.*
(Continued)

*Primary Examiner* — Alex Usyatinsky
(74) *Attorney, Agent, or Firm* — Squire Patton Boggs (US) LLP

(57) ABSTRACT

Provided is a method of controlling a fuel cell system including a stop command sensing process of sensing a stop command output when the fuel cell system stops, an anode pressure increasing process of increasing pressure so that the pressure of the anode reaches a first predetermined pressure value, and a stop-time discharge process of performing discharge by consuming oxygen remaining within an oxidant off-gas while driving an oxidant off-gas circulation pump.

8 Claims, 5 Drawing Sheets

(51) Int. Cl.

| | |
|---|---|
| H01M 8/0432 | (2016.01) |
| H01M 8/0438 | (2016.01) |
| H01M 8/04225 | (2016.01) |
| H01M 8/04223 | (2016.01) |
| H01M 8/04302 | (2016.01) |
| H01M 8/0444 | (2016.01) |
| H01M 8/04089 | (2016.01) |
| H01M 8/04537 | (2016.01) |
| H01M 8/04746 | (2016.01) |

(52) U.S. Cl.
CPC .... *H01M 8/04302* (2016.02); *H01M 8/04328* (2013.01); *H01M 8/04432* (2013.01); *H01M 8/04619* (2013.01); *H01M 8/04753* (2013.01); *H01M 2250/20* (2013.01)

(56) References Cited

U.S. PATENT DOCUMENTS

2011/0143243 A1* 6/2011 Arthur .............. H01M 8/04223
  429/429

2012/0270127 A1* 10/2012 Paganelli .......... H01M 8/04388
  429/429

FOREIGN PATENT DOCUMENTS

| | | |
|---|---|---|
| JP | 2006-073376 A | 3/2006 |
| JP | 2007-506243 A | 3/2007 |
| JP | 2009-037770 A | 2/2009 |
| JP | 2009-093800 A | 4/2009 |
| JP | 2012-069439 A | 4/2012 |
| JP | 2013-089352 A | 5/2013 |
| WO | WO 2005/036668 A2 | 4/2005 |

OTHER PUBLICATIONS

German Search Report application No. 10 2014 200 892.1 dated Mar. 27, 2014.

Notice of Reasons for Rejection dated Aug. 9, 2016 corresponding to Japanese Patent Application No. 2013-012447 and English translation thereof.

* cited by examiner

METHOD FOR CONTROLLING FUEL CELL SYSTEM

CROSS-REFERENCE TO RELATED APPLICATION

Priority is claimed on Japanese Patent Application No. 2013-012447, filed Jan. 25, 2013, the disclosure of which is hereby incorporated herein by reference in its entirety.

BACKGROUND OF THE INVENTION

Field of the Present Invention

The present invention relates to a method of controlling a fuel cell system.

Description of Related Art

A fuel cell, for example, may be a stack configured by stacking a plurality of cells, each of which is formed by sandwiching a solid polymer electrolyte membrane including a solid polymer ion exchange membrane or the like from both sides by an anode and a cathode and further clamping outer sides thereof by one pair of separators. This fuel cell generates power by supplying hydrogen gas as a fuel gas to the anode of each cell and supplying air containing oxygen as an oxidant gas to the cathode.

In addition, it is known that a fuel cell vehicle equipped with such a fuel cell improves fuel efficiency by performing idle stop (hereinafter referred to as "idle stop of a fuel cell system") for temporarily stopping power generation in the fuel cell.

Incidentally, it is known that, in this type of fuel cell, at the stop of power generation of the fuel cell including the idle stop of the above-described fuel cell system, a so-called crossover in which hydrogen gas of the anode side remaining within the fuel cell is transmitted through the solid polymer electrolyte membrane and diffused into the cathode side and oxygen in the air of the cathode side is transmitted through the solid polymer electrolyte membrane and diffused into the anode side occurs. When the crossover occurs, a reaction gas electrochemically reacts in the vicinity of the solid polymer electrolyte membrane and the solid polymer electrolyte membrane is likely to be deteriorated. Because of this, when the power generation of the fuel cell is stopped, it is necessary to reduce an oxygen concentration by consuming oxygen remaining on the cathode side of the fuel cell and form a nitrogen-rich atmosphere.

For example, in Published Japanese Translation No. 2007-506243 of the PCT International Publication, there is disclosed a combustor configured to promote the reaction between a fuel (fuel gas) and oxygen (an oxidant gas), and a method of controlling the fuel cell system which supplies nitrogen gas after oxygen has been consumed by the combustor to the anode and the cathode of the fuel cell when the fuel cell system is stopped.

In addition, in Japanese Unexamined Patent Application, First Publication No. 2003-115317, there is disclosed a method of controlling a fuel cell system which re-circulates an exhaust gas exhausted from a cathode of a fuel cell using a compressor to supply the re-circulated exhaust gas to the cathode when power generation of the fuel cell is stopped, continues the power generation according to oxygen remaining in the exhaust gas, and stops the power generation when a power generation voltage is less than or equal to a predetermined value.

SUMMARY OF THE INVENTION

However, in the method of controlling the fuel cell system disclosed in Published Japanese Translation No. 2007-506243 of the PCT International Publication, the combustor, a valve (fuel deactivation valve) for supplying a fuel gas to the combustor, etc. are necessary, and a configuration of the fuel cell system becomes complex.

In addition, in Japanese Unexamined Patent Application, First Publication No. 2003-115317, the remaining oxygen is consumed when the power generation of the fuel cell is stopped according to a system configuration simpler than in Published Japanese Translation No. 2007-506243 of the PCT International Publication. However, when an amount of fuel gas of the anode is insufficient, there is a possibility of power not being stabilized due to a lack of so-called anode stoichiometry (an amount of supply to the fuel cell/a theoretical amount of hydrogen consumption) and the deterioration of the electrodes of the cell or the like is induced. In addition, there is a possibility of the crossover in which oxygen is transmitted from the cathode side and the anode side occurring and the deterioration of a solid polymer electrolyte membrane being induced.

In this manner, in the related art, there is a need for improvement in suppressing the deterioration of the fuel cell.

An aspect of the present invention is made in consideration of the above-described circumstances, and an object thereof is to provide a method of controlling a fuel cell system capable of suppressing the deterioration of a fuel cell when the fuel cell system is stopped.

An aspect according to the present invention includes the following means for achieving the object related to solving the problems.

(1) According to an aspect of the present invention, there is provided a method of controlling a fuel cell system including a fuel cell which generates power by supplying a fuel gas to an anode and supplying an oxidant gas to a cathode, a fuel gas supply path through which the fuel gas supplied to the anode flows, a fuel off-gas exhaust path through which a fuel off-gas exhausted from the anode flows, an oxidant gas supply path through which the oxidant gas supplied to the cathode flows, an oxidant off-gas exhaust path through which an oxidant off-gas exhausted from the cathode flows, an oxidant off-gas circulation path which connects the oxidant gas supply path and the oxidant off-gas exhaust path, an oxidant gas supply unit which supplies the oxidant gas to the cathode, and an oxidant off-gas circulation unit which is arranged on the oxidant off-gas circulation path and circulates the oxidant off-gas, the method including: a stop command sensing process of sensing a stop command output when the fuel cell system stops; an anode pressure increasing process of increasing pressure so that the pressure of the anode reaches a first predetermined pressure value after the stop command has been sensed in the stop command sensing process; and a stop-time discharge process of performing discharge by consuming oxygen remaining within the oxidant off-gas while driving the oxidant off-gas circulation unit after the anode pressure increasing process.

According to the aspect of (1), it is possible to perform the stop-time discharge process in a state in which a fuel gas has been sufficiently secured in the anode because there are provided the anode pressure increasing process of increasing the pressure so that the pressure of the anode is set to the first predetermined pressure value after the stop command has been sensed and the stop-time discharge process of performing discharge by consuming oxygen remaining within the oxidant off-gas while driving the oxidant off-gas circulation unit after the anode pressure increasing process. Thereby, even when a large current has been generated immediately after the stop-time discharge process has been started, it is possible to prevent the lack of so-called anode stoichiometry (an amount of supply to the fuel cell/a theoretical amount of hydrogen consumption) and suppress electrode deterioration or the like. In addition, because oxygen remaining on the cathode side of the fuel cell can be consumed, the deterioration of the solid polymer electrolyte membrane can be suppressed by suppressing a so-called crossover in which the oxidant gas is transmitted from the cathode side to the anode side. Therefore, the deterioration of the fuel cell can be suppressed when the fuel cell system stops.

(2) In the aspect of (1), the fuel cell system may further include: a fuel off-gas circulation path which connects the fuel gas supply path and the fuel off-gas exhaust path; and a fuel off-gas circulation unit which is arranged on the fuel off-gas circulation path and circulates the fuel off-gas, and the stop-time discharge process may be performed by driving the fuel off-gas circulation unit.

According to the aspect of (2), because the stop-time discharge process is performed by driving the fuel off-gas circulation unit, it is possible to cause oxygen within the oxidant off-gas of the cathode side to react early by circulating the fuel off-gas within the fuel gas supply path, the fuel off-gas exhaust path, and the fuel off-gas circulation path. Thereby, because oxygen of the cathode side can be rapidly consumed, it is possible to end the stop-time discharge process early. In addition, it is possible to improve the drainage of generation water staying on the anode side by circulating the fuel off-gas of the anode side. In addition, because the fuel off-gas is circulated and supplied, it is possible to suppress the deterioration of an electrode or the like by suppressing the lack of anode stoichiometry and improve the stability of discharge.

(3) In the aspect of (2), in the stop-time discharge process, the discharge may continue while adjustment is performed so that the pressure of the anode is set to a second predetermined pressure value less than the first predetermined pressure value.

According to the aspect of (3), because the discharge continues while the adjustment is performed so that the pressure of the anode is set to the second predetermined pressure value less than the first predetermined pressure value, it is possible to perform the stop-time discharge process by suppressing surplus supply of the fuel gas. Thereby, the deterioration of the solid polymer electrolyte membrane can be suppressed by suppressing the crossover of the fuel gas from the anode side to the cathode side. Therefore, the deterioration of the fuel cell can be suppressed when the fuel cell system stops.

(4) In the aspect of (3), when the fuel off-gas circulation unit has failed in the stop-time discharge process, the discharge may continue while adjustment is performed so that the pressure of the anode is set to a third predetermined pressure value greater than the second predetermined pressure.

According to the aspect of (4), because the discharge continues while the adjustment is performed so that the pressure of the anode is set to the third predetermined pressure value greater than the second predetermined pressure value when the fuel off-gas circulation unit has failed, it is possible to suppress the lack of anode stoichiometry according to high pressure of the fuel gas and secure the stability of discharge even when the fuel off-gas circulation unit has failed.

(5) In the aspect of any one of (1) to (4), in the stop-time discharge process, adjustment may be performed to set the pressure of the anode to a fourth predetermined pressure value greater than the first predetermined pressure value after an end of the discharge.

According to the aspect of (5), because the adjustment is performed so that the pressure of the anode is set to the fourth predetermined pressure value greater than the first predetermined pressure value after the end of the discharge, the fuel gas can be kept in the anode according to pressure keeping and the anode side and the cathode side can be in a hydrogen-rich state. Thereby, it is possible to prevent the anode side and the cathode side from being in an air-rich state and prevent the cathode from being exposed to high potential at the start of the next time.

(6) In the aspect of (5), when the discharge has been shut off before the end of the discharge, the stop-time discharge process may end without the adjustment of setting the pressure of the anode to the fourth predetermined pressure value.

When the discharge has been shut off before the end of the discharge, unreacted oxygen is considered to remain on the cathode side. On the other hand, according to the aspect of (6), because the stop-time discharge process ends without performing adjustment so that the pressure of the anode is set to the fourth predetermined pressure value greater than the first predetermined pressure value, it is possible to reduce an amount of hydrogen which reacts with oxygen remaining on the cathode side. Therefore, because it is possible to prevent the oxygen remaining on the cathode side and hydrogen transmitted through the solid polymer electrolyte membrane and penetrating the cathode side from locally reacting on the face of the solid polymer electrolyte membrane, it is possible to prevent the deterioration of the fuel cell due to the deterioration of the solid polymer electrolyte membrane.

(7) In the aspect of any one of (2) to (4), when the fuel off-gas circulation unit fails and it is difficult to circulate the fuel off-gas, a current value of the discharge may be set to a fixed lower-limit current value in the stop-time discharge process.

When the fuel off-gas circulation unit fails and it is difficult to circulate the fuel off-gas, hydrogen is unlikely to be sufficiently supplied to the anode. On the other hand, according to the aspect of (7), because a current value of the discharge is set to the fixed lower-limit current value, it is possible to suppress the deterioration of an electrode by suppressing the lack of anode stoichiometry. Therefore, the deterioration of the fuel cell can be suppressed even when the fuel off-gas circulation unit has failed.

(8) In the aspect of any one of (2) to (4) and (7), in the stop-time discharge process, a current value of the discharge may be determined in correspondence with the real number of rotations of the fuel off-gas circulation unit.

According to the aspect of (8), because the current value of the discharge is determined in correspondence with the real number of rotations of the fuel off-gas circulation unit, the real number of rotations of the fuel off-gas circulation unit, that is, a discharge current corresponding to a supply amount of the fuel gas, can be generated. Therefore, for example, even when the fuel off-gas circulation unit does not rotate according to a command value of the fuel cell system due to the deterioration of the fuel off-gas circulation unit or the like, the deterioration of the fuel cell can be suppressed by suppressing the lack of anode stoichiometry.

(9) In the aspect of any one of (2) to (4), (7) and (8), in the stop-time discharge process, a pressure value of the anode in the discharge may be determined in correspondence with the real number of rotations of the fuel off-gas circulation unit.

According to the aspect of (9), because a pressure value of the anode in the discharge is determined in correspondence with the real number of rotations of the fuel off-gas circulation unit, the pressure of the anode can be adjusted by making up the fuel gas in correspondence with the real number of rotations of the fuel off-gas circulation unit. Therefore, for example, even when the fuel off-gas circulation unit does not rotate according to a command value of the fuel cell system due to the deterioration of the fuel off-gas circulation unit or the like, the deterioration of the fuel cell can be suppressed by suppressing the lack of anode stoichiometry.

(10) In the aspect of any one of (1) to (9), the fuel cell system may further include: an exhaust valve for exhausting the fuel off-gas; a gas-liquid separator which is arranged on the fuel off-gas exhaust path and separates the fuel off-gas and liquid mixed inside the fuel off-gas to store the liquid; and a drain valve for draining the liquid stored inside the gas-liquid separator, and, in the stop-time discharge process, the discharge is performed by closing the exhaust valve and the drain valve.

According to the aspect of (10), because the discharge is performed by closing the exhaust valve and the drain valve in the stop-time discharge process, it is possible to prevent hydrogen from being exhausted outside the fuel cell system through the exhaust valve and the drain valve. Therefore, the lack of anode stoichiometry by the external exhaust of the hydrogen can be prevented and ineffective hydrogen consumption can be suppressed. In addition, when the hydrogen is exhausted outside the fuel cell system 1, the diluter generally performs dilution by causing the hydrogen and oxygen to react. However, because the exhaust valve and the drain valve are closed according to the present invention, it is possible to prevent a large amount of hydrogen from being introduced into the diluter. Therefore, it is possible to easily dilute the hydrogen and exhaust the diluted hydrogen outside the fuel cell system.

(11) In the aspect of any one of (1) to (10), the fuel cell system may further include: a first sealing valve arranged on an upstream side of a flow direction of the oxidant gas rather than a connection portion with the oxidant off-gas circulation path in the oxidant gas supply path; and a second sealing valve arranged on a downstream side of a flow direction of the oxidant off-gas rather than the connection portion with the oxidant off-gas circulation path in the oxidant off-gas exhaust path, and at least the second sealing valve is closed in the stop-time discharge process.

According to the aspect of (11), by performing the stop-time discharge process in a state in which at least the second sealing valve has been closed, oxygen within each flow path of the oxidant gas supply path, the oxidant off-gas exhaust path, and the oxidant off-gas circulation path which connects the oxidant gas supply path and the oxidant off-gas exhaust path can be rapidly consumed. Therefore, because the atmosphere of the cathode can rapidly become nitrogen-rich, the deterioration of the fuel cell can be further suppressed.

According to each aspect of the present invention, it is possible to perform the stop-time discharge process in a state in which a fuel gas has been sufficiently secured in the anode because there are provided the anode pressure increasing process of increasing the pressure so that the pressure of the anode is set to the first predetermined pressure value after the stop command has been sensed and the stop-time discharge process of performing discharge by consuming oxygen remaining within an oxidant off-gas while driving the oxidant off-gas circulation unit after the anode pressure increasing process.

Thereby, even when a large current has been generated immediately after the stop-time discharge process has been started, it is possible to prevent the lack of so-called stoichiometry (an amount of supply to the fuel cell/a theoretical amount of hydrogen consumption) and suppress electrode deterioration or the like. In addition, because oxygen remaining on the cathode side of the fuel cell can be consumed, the deterioration of the solid polymer electrolyte membrane can be suppressed by suppressing a so-called crossover in which the oxidant gas is transmitted from the cathode side to the anode side. Therefore, the deterioration of the fuel cell can be suppressed when the fuel cell system stops.

DETAILED DESCRIPTION OF THE INVENTION (Fuel Cell System)

Hereinafter, a method of controlling a fuel cell system according to an embodiment of the present invention will be described. Hereinafter, the method of controlling the fuel cell system will be described after a schematic configuration of the fuel cell system has been described.

Figure 1:
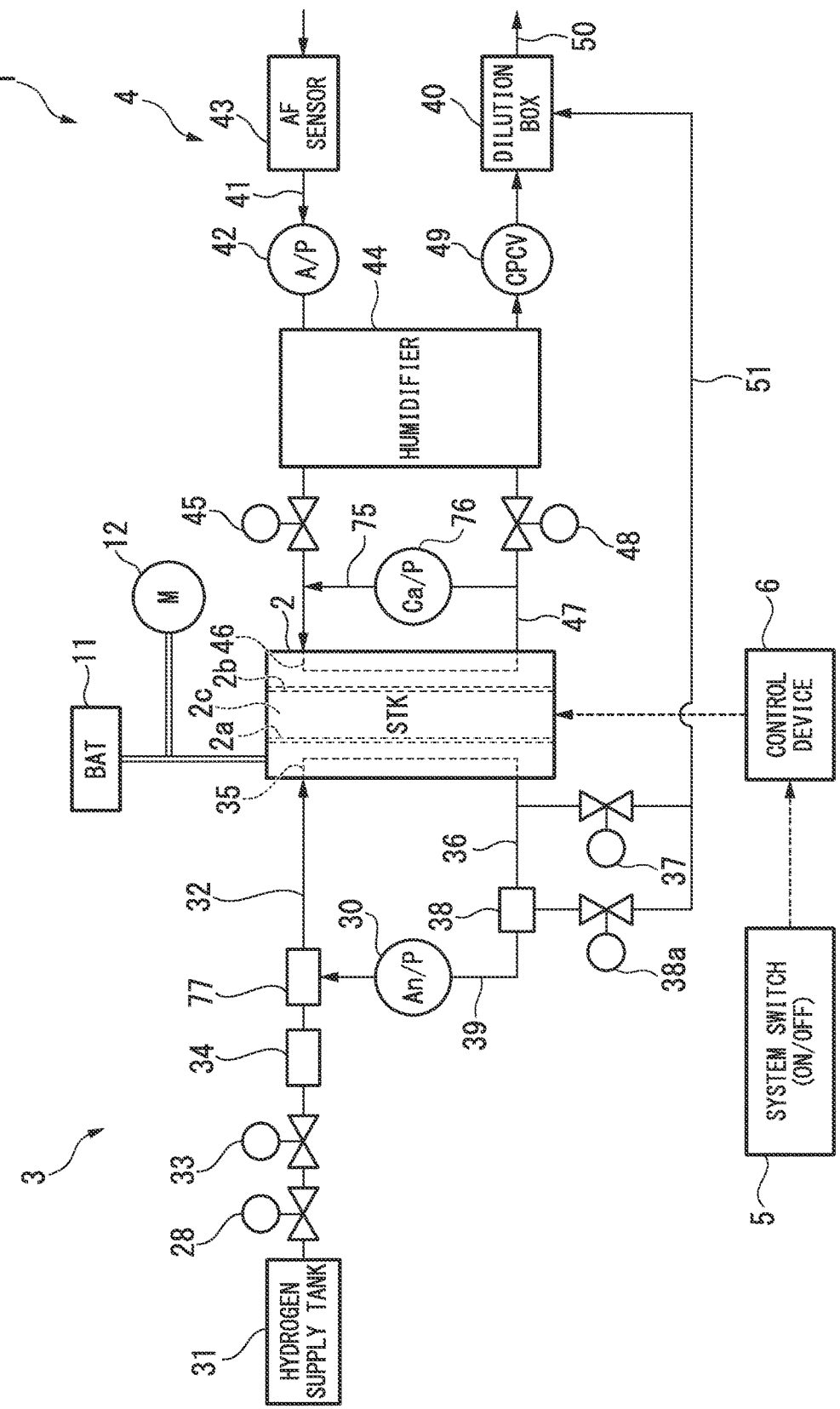
FIG. 1 is a schematic configuration diagram of a fuel cell system according to an embodiment of the present invention.

FIG. 1 is a schematic configuration diagram of the fuel cell system 1.

As illustrated in FIG. 1, the fuel cell system 1 of this embodiment is mounted on a fuel cell vehicle, and mainly includes a fuel cell 2 (abbreviated as STK in the drawing), an anode-side flow path 3 for supplying hydrogen which is a fuel gas to an anode 2a of the fuel cell 2, a cathode-side flow path 4 for supplying air which is an oxidant gas to a cathode 2b of the fuel cell 2, a high-voltage battery 11 (abbreviated as BAT in the drawing) which accumulates power generated by the fuel cell 2, a control device 6 which generally controls these respective components, and a system switch 5 to be operated by the user when the fuel cell system 1 starts and stops.

The fuel cell 2, for example, is configured by stacking a plurality of cells, each of which is formed by sandwiching a solid polymer electrolyte membrane 2c including a solid polymer ion exchange membrane or the like from both sides by the anode 2a and the cathode 2b (only a single cell is illustrated in FIG. 1 for convenience of illustration). When hydrogen is supplied as a fuel gas to the anode 2a and air including oxygen is supplied as an oxidant gas to the cathode 2b, hydrogen ions generated by a catalytic reaction in the anode 2a pass through the solid polymer electrolyte membrane 2c and move to the cathode 2b, power is generated by causing an electrochemical reaction with oxygen in the cathode 2b and water is generated.

The fuel cell 2 is connected to the high-voltage battery 11 via a contactor or a voltage-controlled unit (VCU) (not illustrated) or the like, and the high-voltage battery 11 is chargeable with electricity generated by the fuel cell 2. The fuel cell 2 and the high-voltage battery 11 are dischargeably connected to an external load such as an electric motor 12 (abbreviated as M in the drawing) of the fuel cell vehicle.

(Anode-Side Flow Path)

The anode-side flow path 3 is formed by a fuel gas supply path 32 through which the fuel gas supplied to the anode 2a flows, a fuel off-gas exhaust path 36 through which a fuel off-gas exhausted from the anode 2a flows, and a fuel off-gas circulation path 39 which connects the fuel gas supply path 32 and the fuel off-gas exhaust path 36.

The fuel gas supply path 32 is directed from an upstream side of a flow direction of the fuel gas to a downstream side, and a hydrogen supply tank 31, a shutoff valve 33, a fuel injector 34, and an ejector 77 are sequentially connected. The fuel gas supply path 32 is connected to a fuel flow path 35 which faces the anode 2a within the fuel cell 2 on the inlet side of the fuel cell 2.

The hydrogen supply tank 31 is filled with hydrogen gas which is a fuel gas. An electromagnetic type in-tank electromagnetic valve 28 which supplies and shuts off hydrogen gas is attached to the hydrogen supply tank 31. The in-tank electromagnetic valve 28 has a solenoid (not illustrated), and performs a valve opening operation by energizing the solenoid.

The driving of the fuel injector 34 is controlled by an output signal (for example, a predetermined opening command time) from the control device 6, and the fuel gas is intermittently supplied to the fuel gas supply path 32 in a predetermined cycle. The fuel injector 34 is operated according to target pressure control, and inter-electrode difference pressure between the anode 2a and the cathode 2b of the fuel cell 2 is held at a predetermined pressure. Then, a fuel gas supplied from the fuel injector 34 is supplied to the fuel flow path 35. Hereinafter, the opening command time of the fuel injector 34 is referred to as a Ti value.

The ejector 77 suctions a fuel off-gas exhausted from the fuel cell 2 through the fuel off-gas circulation path 39, merges a fresh fuel gas supplied from the hydrogen supply tank 31 and the fuel off-gas, and again supplies the merged gas to the fuel flow path 35 of the fuel cell 2. That is, the fuel off-gas exhausted from the fuel cell 2 is circulated through the fuel cell 2 through the fuel off-gas exhaust path 36, the fuel off-gas circulation path 39, the ejector 77, and the fuel gas supply path 32.

The fuel off-gas exhaust path 36 is connected to the outlet side of the fuel flow path 35, and a fuel off-gas provided for power generation by the fuel cell 2, water generated by the fuel cell 2 according to power generation or condensation, or the like flows.

A catch tank (gas-liquid separator) 38 is provided on the fuel off-gas exhaust path 36. The catch tank 38 stores water generated by separating the fuel off-gas which is exhausted from the inlet of the fuel flow path 35 and flows through the fuel off-gas exhaust path 36 and generation water (liquid) mixed inside the fuel off-gas.

A drain valve 38a is provided on a moisture exhaust channel 51 which connects a moisture outlet (not illustrated) of the catch tank 38 and a dilution box 40. Moisture exhausted from the moisture outlet of the catch tank 38 can be supplied to the dilution box 40 by opening the drain valve 38a.

The fuel off-gas exhaust path 36 is branched on the upstream side of the catch tank 38, and connected to the moisture exhaust channel 51 via a purge valve (exhaust valve) 37.

The dilution box 40 is provided with an internal retention chamber (not illustrated) in which a fuel off-gas introduced from the fuel off-gas exhaust path 36 via the purge valve 37 stays, and the retention chamber is connected to an exhaust flow path 50. That is, after the fuel off-gas has been diluted by the oxidant off-gas within the retention chamber, the diluted off-gas is exhausted from the exhaust flow path 50 outside the vehicle. The oxidant off-gas is supplied to the dilution box 40 based on a concentration of the fuel off-gas introduced from the fuel off-gas exhaust path 36.

The fuel off-gas circulation path 39 is provided on the downstream side of the catch tank 38 in the fuel off-gas exhaust path 36. The fuel off-gas circulation path 39 is connected to the ejector 77 provided on the fuel gas supply path 32 via a fuel off-gas circulation pump (fuel off-gas circulation unit) 30 (which is abbreviated as An/P in the drawing).

The fuel off-gas circulation pump 30 circulates part of the fuel off-gas exhausted from the fuel flow path 35 of the fuel cell 2 and mixes the circulated fuel off-gas with a fuel gas supplied from the hydrogen supply tank 31, thereby again supplying the mixed gas to the anode 2a of the fuel cell 2.

(Cathode-Side Flow Path)

The cathode-side flow path 4 is formed by an oxidant gas supply path 41 through which the oxidant gas supplied to the cathode 2b flows, an oxidant off-gas exhaust path 47 through which an oxidant off-gas exhausted from the cathode 2b flows, and an oxidant off-gas circulation path 75 which connects the oxidant gas supply path 41 and the oxidant off-gas exhaust path 47.

On the upstream side of the flow direction of the oxidant gas in the oxidant gas supply path 41, an air flow sensor 43 (abbreviated as an AF sensor in the drawing) installed on an intake manifold (not illustrated) and an air pump (oxidant gas supply unit) 42 (which is abbreviated as A/P in the drawing) for supplying the oxidant gas to the fuel cell 2 are sequentially connected from the upstream side of the flow direction of the oxidant gas to the downstream side.

The air pump 42 pressurizes an oxidant gas (air) acquired from the outside to a predetermined pressure, and feeds pressure through the oxidant gas supply path 41 to supply the cathode 2b of the fuel cell 2 with the fed pressure.

The air flow sensor 43 detects an oxidant gas flow rate acquired from the outside by the air pump 42 and outputs a signal of a detection result, for example, to the control device 6. The oxidant gas flow rate is controlled based on a flow amount command value output from the control device 6 to the air pump 42.

The downstream side rather than the air pump 42 in the oxidant gas supply path 41 is sequentially connected to a humidifier 44 and an inlet sealing valve (first sealing valve) 45, and connected to the oxidant flow path 46 which faces the cathode 2b on the inlet side of the fuel cell 2.

The oxidant off-gas exhaust path 47 is connected to the outlet side of the oxidant flow path 46, and a fuel off-gas provided for power generation by the fuel cell 2, water generated by the fuel cell 2 according to power generation or condensation, or the like flows.

The oxidant off-gas exhaust path 47 is directed from the upstream side of the flow direction of the oxidant off-gas to the downstream side, sequentially connected to an outlet sealing valve (second sealing valve) 48, the humidifier 44, and a pressure control valve 49 (which is abbreviated as CPCV in the drawing), and then connected to the dilution box 40.

The inlet sealing valve 45 and the outlet sealing valve 48 are electromagnetic drive type sealing valves, and are configured so that the oxidant gas can be sealed between the inlet sealing valve 45 and the outlet sealing valve 48, that is, within the oxidant flow path 46.

The humidifier 44 includes a moisture permeable membrane such as a hollow fiber membrane, and is provided for power generation in the fuel cell 2 and humidifies an oxidant gas output from the air pump 42 using a wet oxidant off-gas as a humidification gas. Thereby, it is possible to humidify the oxidant gas in advance in a front stage in which it is supplied to the fuel cell 2.

On the upstream side of the outlet sealing valve 48 in the oxidant off-gas exhaust path 47, the oxidant off-gas circulation path 75 is branched and provided. The oxidant off-gas circulation path 75 is connected to the downstream side of the inlet sealing valve 45 in the oxidant gas supply path 41 via the oxidant off-gas circulation pump (oxidant off-gas circulation unit) 76 (which is abbreviated as Ca/P in the drawing).

The oxidant off-gas circulation pump 76 circulates part of the oxidant off-gas exhausted from the oxidant flow path 46 of the fuel cell 2 and mixes the circulated oxidant off-gas with an oxidant off-gas supplied from the air pump 42, thereby again supplying the mixed gas to the cathode 2b of the fuel cell 2.

A system switch 5 is a switch to be operated by a user when the fuel cell system 1 starts (on) and stops (off), and outputs an on/off signal to the control device. The system switch 5 of this embodiment, for example, is an ignition switch of the fuel cell vehicle.

The control device 6 controls the start/stop of the fuel cell system 1 based on the on/off signal input from the system switch 5. In addition, the control device 6 controls the air pump 42 or the oxidant off-gas circulation pump 76, the fuel off-gas circulation pump 30, the inlet sealing valve 45, the outlet sealing valve 48, the pressure control valve 49, the in-tank electromagnetic valve 28, the shutoff valve 33, the purge valve 37, the drain valve 38a, the fuel injector 34, the ejector 77, etc. according to control content such as output control of the fuel cell 2.

(Method of Controlling Fuel Cell System)

In the fuel cell system 1 configured as described above, discharge in which oxygen remaining within the oxidant off-gas of the fuel cell 2 is consumed is performed when the fuel cell system 1 stops. By performing the discharge, a high-potential state of the cathode 2b is prevented by decreasing a concentration of oxygen remaining on the side of the cathode 2b, and the deterioration of the solid polymer electrolyte membrane 2c of the fuel cell 2 is prevented. Hereinafter, the method of controlling the fuel cell system 1 according to the present invention, specifically, a discharge control method in a stop process of the fuel cell system 1, will be described in detail using the flowchart. Also, FIG. 1 will be referred to for reference signs of respective parts in the description of the flowchart.

Figure 2:
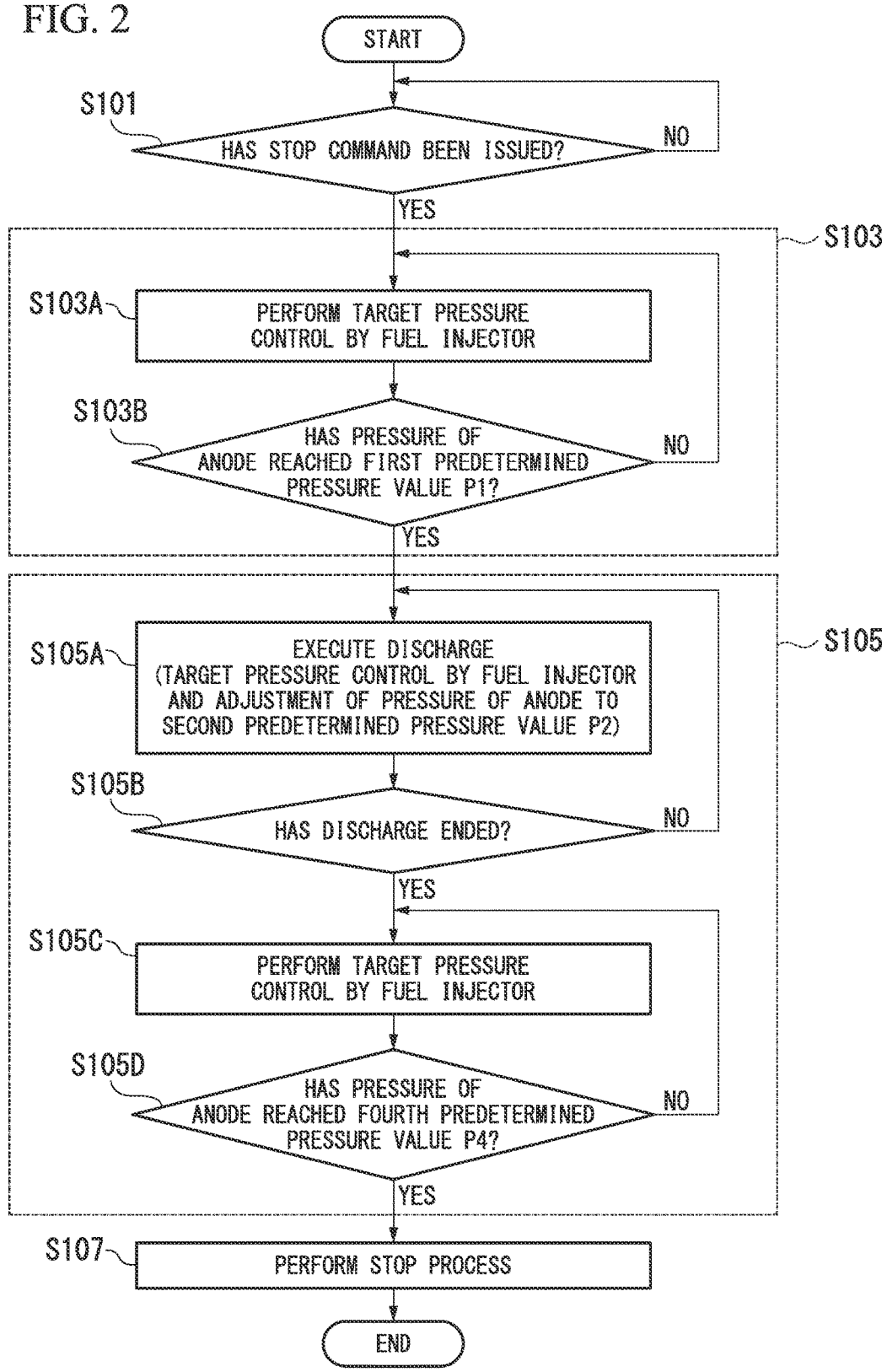
FIG. 2 is a flowchart of a method of controlling the fuel cell system.

FIG. 2 is a flowchart of a method of controlling the fuel cell system 1.

As illustrated in FIG. 2, the method of controlling the fuel cell system 1 of this embodiment includes a stop command sensing process S101, an anode pressure increasing process S103, a stop-time discharge process S105, and a stop process 107. Hereinafter, the respective processes will be described. The flowchart illustrated in FIG. 2 illustrates one process of processing content to be performed by the control device 6 of the fuel cell system 1. Consequently, when one process from the start to the end of the flowchart illustrated in FIG. 2 ends, the control device 6 again executes the start process and iteratively executes a processing flow of the flowchart.

(Stop Command Sensing Process)

In the stop command sensing process S101, a stop command to be output when the fuel cell system 1 is stopped is sensed. Specifically, the control device 6 senses an off signal (hereinafter referred to as a "stop command") to be output when a user of the fuel cell vehicle has turned off the ignition switch which is the system switch 5. When the control device 6 has sensed the stop command, it is determined to be "YES" in the stop command sensing process S101 and the process proceeds to the anode pressure increasing process S103. On the other hand, when the control device 6 does not sense the stop command, it is determined to be "NO" in the stop command sensing process S101 and the stop command sensing process S101 is again performed.

(Anode Pressure Increasing Process)

Figure 3:
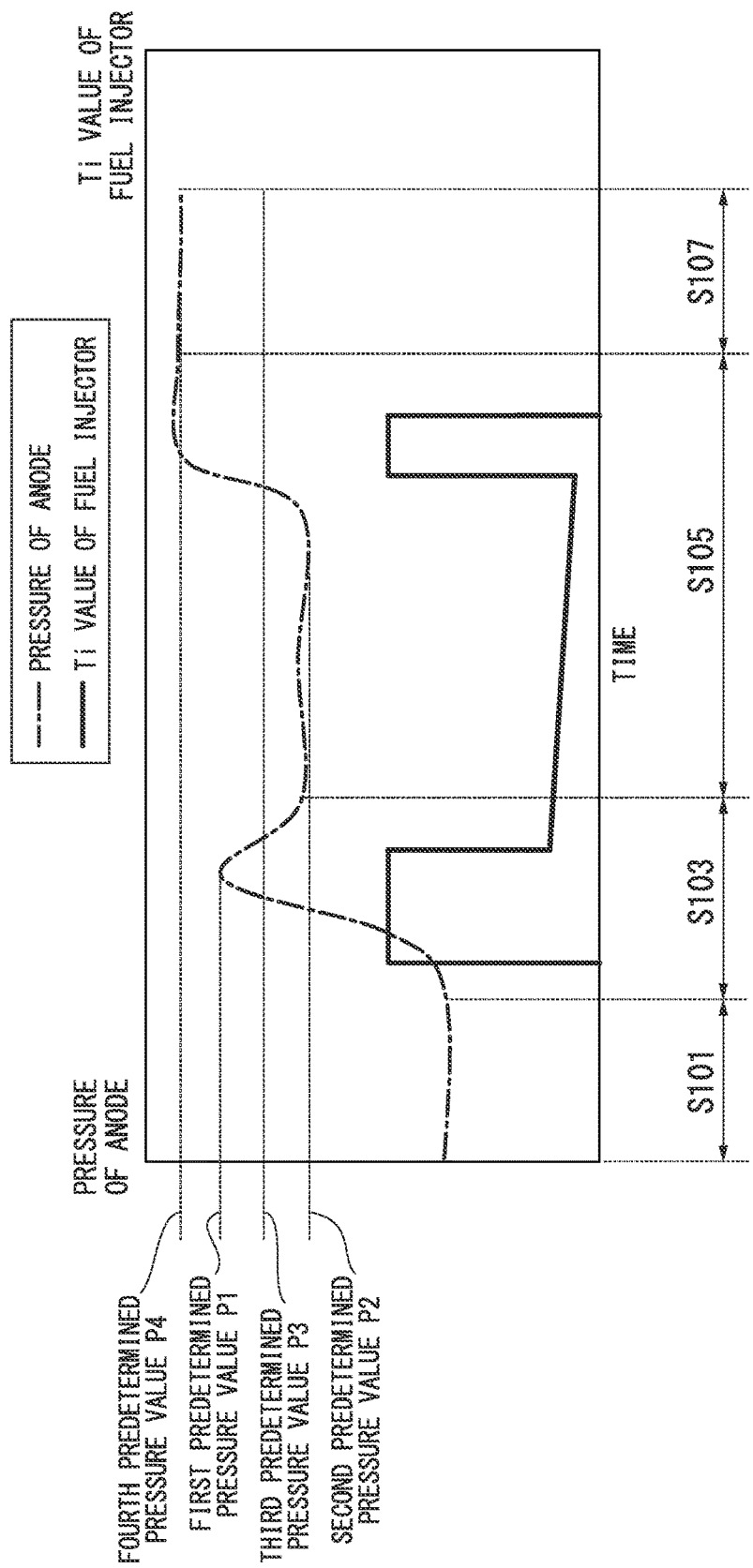
FIG. 3 is a graph illustrating variation in pressure of an anode and variation in a Ti value of a fuel injector.

FIG. 3 is a graph illustrating variation in pressure of the anode 2a when the vertical axis represents pressure of the anode 2a and the horizontal axis represents time, and variation in a Ti value of a fuel injector when the vertical axis represents a Ti value of the fuel injector 34 and the horizontal axis represents time.

In the anode pressure increasing process S103, target pressure control by the fuel injector 34 is first performed after the stop command has been sensed in the stop command sensing process S101, and the pressure is increased so that the pressure of the anode 2a is set to a first predetermined pressure value P1 (S103A). At this time, as illustrated in FIG. 3, the fuel gas is supplied to the fuel gas supply path 32 by increasing the Ti value of the fuel injector 34 and the target pressure control is performed so that the pressure of the anode 2a is set to the first predetermined pressure value P1.

Then, in the anode pressure increasing process S103, as illustrated in FIG. 2, it is determined whether the pressure of the anode 2a has reached the first predetermined pressure value P1 (S103B). When the pressure of the anode 2a has reached the first predetermined pressure value P1, it is determined to be "YES" and the process proceeds to the stop-time discharge process S105. On the other hand, when the pressure of the anode 2a has not reached the first predetermined pressure value P1, it is determined to be "NO" and the target pressure control by the fuel injector 34 is again performed.

(Stop-Time Discharge Process)

In the stop-time discharge process S105, discharge is performed by consuming oxygen remaining within the cathode-side flow path 4 formed by the oxidant gas supply path 41, the oxidant off-gas exhaust path 47, and the oxidant off-gas circulation path 75 while the oxidant off-gas circulation pump 76 is driven. Specifically, in a state in which the outlet sealing valve 48 of the oxidant off-gas exhaust path 47 has been closed, the oxidant off-gas circulation pump 76 is driven. Further, in a state in which the purge valve 37 and the drain valve 38a have been closed, the fuel off-gas circulation pump 30 is driven while the supply of hydrogen gas to the fuel cell 2 continues. Thereby, it is possible to perform the discharge by circulating the fuel off-gas within the anode-side flow path 3 and circulating the oxidant off-gas within the cathode-side flow path 4 to consume oxygen remaining within the oxidant off-gas.

In the stop-time discharge process S105, the target pressure control of the fuel injector 34 is performed and the discharge is executed while adjustment is performed so that the pressure of the anode 2*a* is set to a second predetermined pressure value P2 less than the first predetermined pressure value P1 (S105A). At this time, as illustrated in FIG. 3, the Ti value of the fuel injector 34 is set to be less than the Ti value in the anode pressure increasing process S103 and the discharge continues by performing adjustment so that the pressure of the anode 2*a* is set to the second pressure value P2.

Then, in the stop-time discharge process S105, as illustrated in FIG. 2, it is determined whether the discharge has ended (S105B). The determination of whether the discharge has ended, for example, is made according to whether a discharge continuation time has reached a predetermined time. The above-described predetermined time is a time in which oxygen of the cathode 2*b* is sufficiently consumed, and, for example, is mapped and defined within the control device 6. In addition, the determination of whether the discharge has ended, for example, may be made according to whether an oxygen concentration of the cathode 2*b* is less than or equal to a predetermined value, and made according to whether a value of a discharge current which flows through the fuel cell 2 is less than or equal to a predetermined value. When the discharge has ended, the target pressure control of the fuel injector 34 is performed by determining it as "YES" (S105C). On the other hand, when the discharge has not ended, the discharge continues by determining it as "NO" (S105A).

Here, in the stop-time discharge process S105, in execution of the discharge (S105A), the current value of the discharge is determined in correspondence with the real number of rotations of the fuel off-gas circulation pump 30 (hereinafter referred to as "discharge current control").

Figure 4:
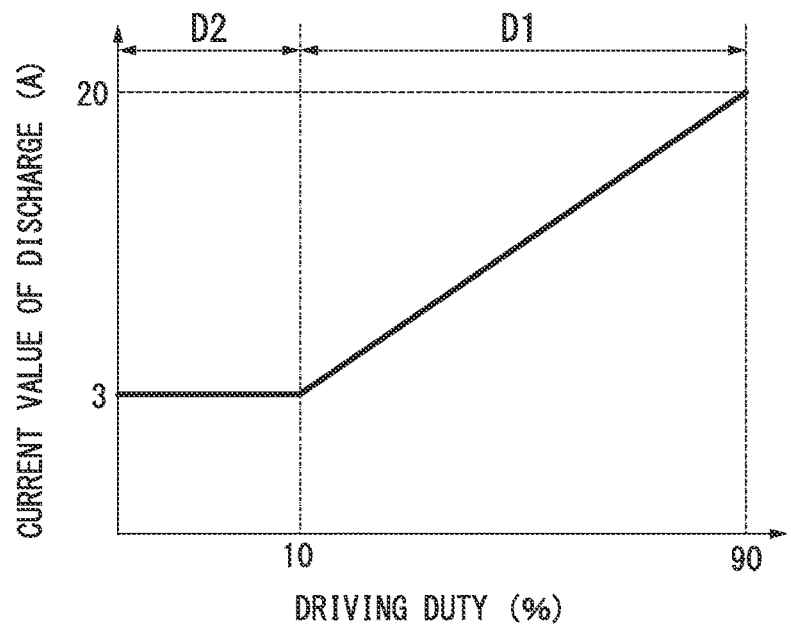
FIG. 4 is a graph illustrating a relationship between a current value of discharge and driving duty of a fuel off-gas circulation pump.

FIG. 4 is a graph illustrating a relationship between the current value of the discharge and the driving duty of the fuel off-gas circulation pump 30 when the vertical axis represents a current value (A) of the discharge and the horizontal axis represents driving duty (%) of the fuel off-gas circulation pump 30. The driving duty of the fuel off-gas circulation pump 30 is referred to as a ratio of a conduction ON time in a driving time of the fuel off-gas circulation pump 30. The driving duty corresponds to the real number of rotations of the fuel off-gas circulation pump 30 and the real number of rotations of the fuel off-gas circulation pump 30 increases when the driving duty is high.

The fuel off-gas circulation pump 30 is controlled in a range D1 in which the driving duty is higher than 10% and less than or equal to 90%. In addition, the fuel off-gas circulation pump 30 is not controlled in a range D2 in which the driving duty is less than or equal to 10% and the number of rotations is zero.

As illustrated in FIG. 4, in the range D1 in which the driving duty is higher than 10% and less than or equal to 90%, the current value of the discharge, for example, is controlled to be gradually increased in a range from 3 A to 20 A in correspondence with an increase in the driving duty (that is, the real number of rotations of the fuel off-gas circulation pump 30). The current value of the discharge corresponding to the driving duty, for example, is mapped in advance, and stored within the control device 6. Also, the current value of 3 A becomes a lower-limit current value in which the discharge can be executed in the fuel cell 2 of this embodiment.

On the other hand, in the range D2 in which the driving duty is less than or equal to 10%, it can be determined that the fuel off-gas circulation pump 30 is not driven, the fuel off-gas circulation pump 30 fails, and it is difficult to circulate the fuel off-gas. Therefore, in the range D2 in which the driving duty is less than or equal to 10%, the fuel gas is supplied by driving the fuel injector 34 and the current value of the discharge is held to the fixed lower-limit current value 3 A.

In addition, in the stop-time discharge process S105, in the execution of the discharge (S105A), the pressure (corresponding to the second predetermined pressure value P2) of the anode 2*a* may be determined in correspondence with the real number of rotations (that is, the driving duty) of the fuel off-gas circulation pump 30 (hereinafter referred to as "anode pressure control").

Figure 5:
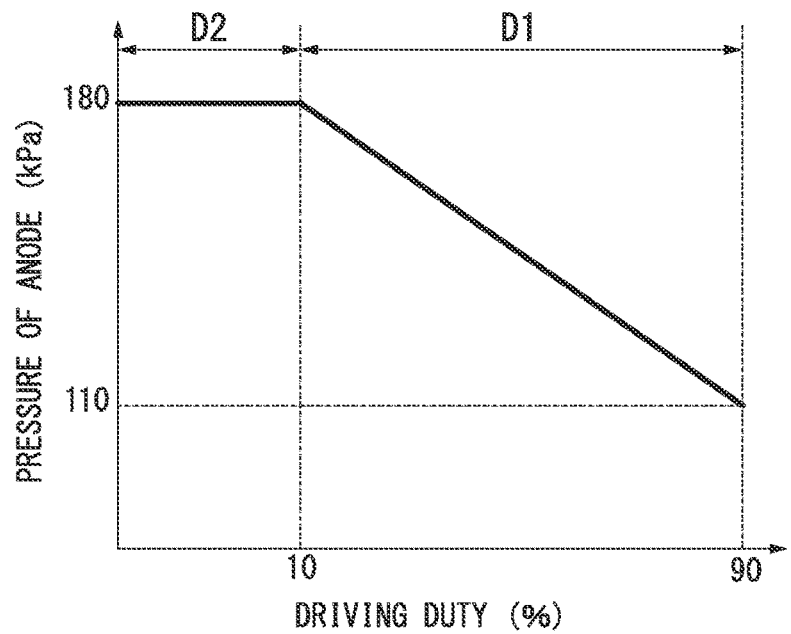
FIG. 5 is a graph illustrating a relationship between the pressure of the anode and the driving duty of the fuel off-gas circulation pump.

FIG. 5 is a graph illustrating a relationship between the pressure of the anode 2*a* and the driving duty of the fuel off-gas circulation pump 30 when the vertical axis represents pressure (kPa) of the anode 2*a* and the horizontal axis represents driving duty (%) of the fuel off-gas circulation pump 30.

As illustrated in FIG. 5, in the range D1 in which the driving duty is higher than 10% and less than or equal to 90%, the pressure of the anode 2*a* is determined to be gradually decreased, for example, in a range from 180 kPa to 110 kPa, in correspondence with an increase in the driving duty (that is, the real number of rotations of the fuel off-gas circulation pump 30). The pressure of the anode 2*a* corresponding to the driving duty (the real number of rotations of the fuel off-gas circulation pump 30), for example, is mapped in advance and stored within the control device 6.

On the other hand, in the range D2 in which the driving duty is less than or equal to 10%, it can be determined that the fuel off-gas circulation pump 30 is not driven, the fuel off-gas circulation pump 30 fails, and it is difficult to circulate the fuel off-gas. Therefore, in the range D2 in which the driving duty is less than or equal to 10%, the fuel off-gas is supplied by driving the fuel injector 34 and adjustment to a third predetermined pressure value P3 (see FIG. 3) is performed. Here, the third predetermined pressure value P3 is set to a value greater than the second predetermined pressure value P2 which is the pressure of the anode 2*a* at the execution of the discharge (S105A), and, for example, is set to 180 kPa in this embodiment. In this manner, adjustment is performed so that the pressure of the anode 2*a* is set to the third predetermined pressure value P3 when the fuel off-gas circulation pump 30 has failed, so that the lack of anode stoichiometry due to high pressure of the fuel gas can be suppressed and stability of the discharge can be secured even when the fuel off-gas circulation pump 30 has failed.

Then, in the stop-time discharge process S105, after the end of the discharge (after it is determined to be "YES" in S105B), target pressure control by the fuel injector 34 is performed and the pressure is increased so that the pressure of the anode 2*a* is set to a fourth predetermined pressure value P4 greater than the first predetermined pressure value P1 (S105C). In the target pressure control S103C by the fuel injector 34, the fuel gas is supplied to the fuel gas supply path 32 by increasing the Ti value of the fuel injector 34, and the pressure of the anode 2*a* is controlled to be the fourth predetermined pressure value P4 (see FIG. 3).

Then, in the stop-time discharge process S105, it is determined whether the pressure of the anode 2*a* has reached the fourth predetermined pressure value P4 (S105D). When the pressure of the anode 2*a* has reached the fourth predetermined pressure value P4, it is determined to be "YES" and the process proceeds to the stop process S107. On the other hand, when the pressure of the anode 2*a* has not reached the fourth predetermined pressure value P4, it is determined to be "NO" and the target pressure control by the fuel injector 34 is again performed (S105D).

Incidentally, in the stop-time discharge process S105, for example, when the remaining capacity of the high-voltage battery 11 has reached a predetermined upper limit, the discharge may be forcibly shut off before the end of the discharge for protection of the high-voltage battery 11. In this case, unreacted oxygen is considered to remain on the side of the cathode 2b. Therefore, when the discharge has been shut off before the end of the discharge, the stop-time discharge process S105 is configured to end without performing adjustment so that the pressure of the anode 2a is set to the fourth predetermined pressure value P4. Thereby, because it is possible to prevent the pressure of the anode 2a from being increased, it is possible to prevent the oxygen remaining on the side of the cathode 2b and hydrogen transmitted through the solid polymer electrolyte membrane and penetrating the side of the cathode 2b from locally reacting on the face of the solid polymer electrolyte membrane.

(Stop Process)

In the stop process S107, the stop process of the fuel cell system 1 is performed, and the fuel cell system 1 stops by stopping auxiliaries such as the air pump 42. Because the fuel cell system 1 stops in a state in which the pressure of the anode 2a has been kept to the fourth predetermined pressure value P4 in the stop process S107 (see FIG. 3), it is possible to stop the fuel cell system 1 in a state in which the side of the anode 2a and the side of the cathode 2b are in a hydrogen-rich state. At a point in time at which the fuel cell system 1 has stopped, the discharge control ends in the stop process of the fuel cell system 1.

Figure 6:
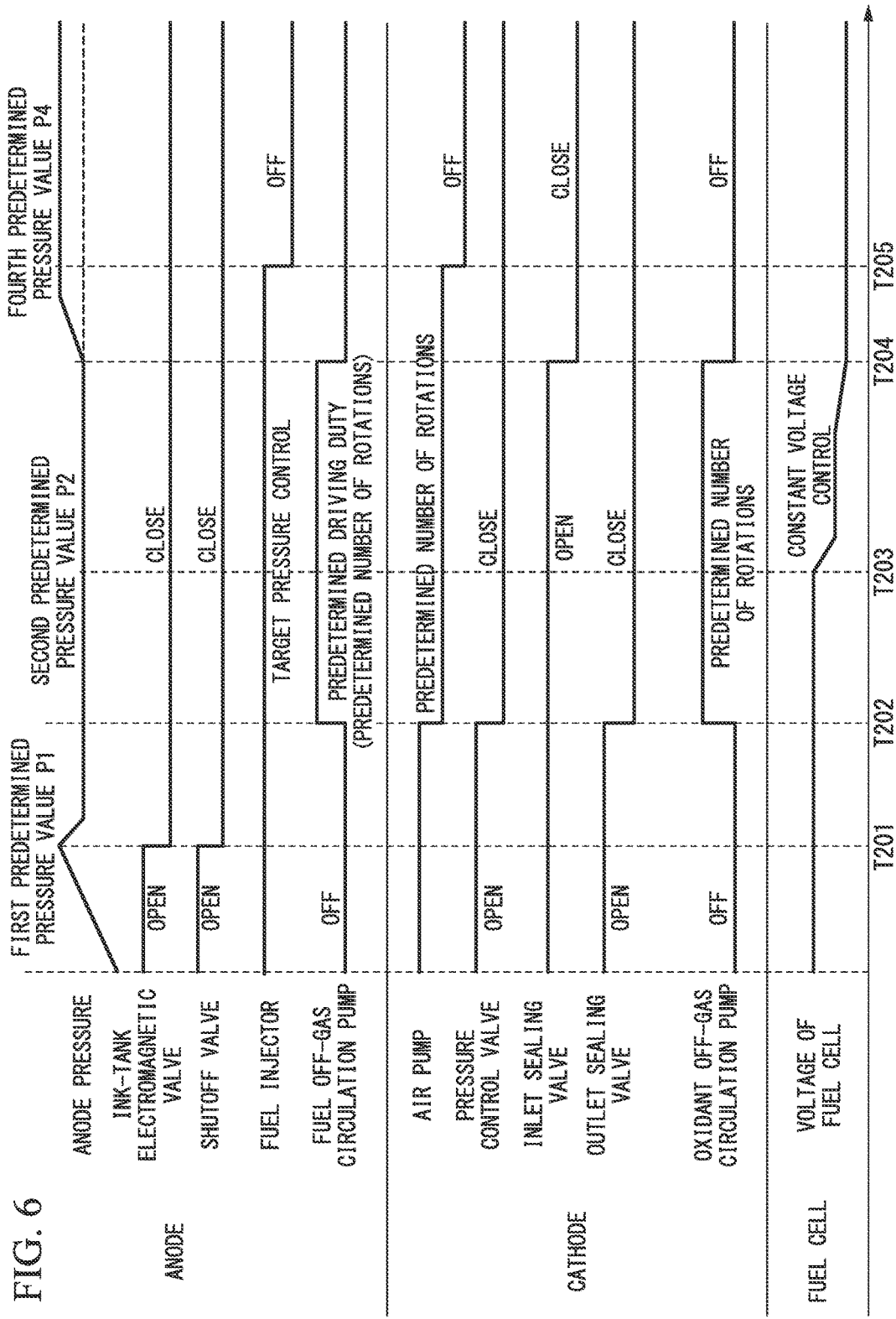
FIG. 6 is a time chart of the method of controlling the fuel cell system.

FIG. 6 is a time chart of the method of controlling the above-described fuel cell system 1. FIG. 1 will be referred to for reference signs of respective parts and FIGS. 2 to 5 will be referred to for respective processes. At the initiation of the time chart of FIG. 6, the user of the fuel cell vehicle turns off the ignition switch which is the system switch 5, and a state in which it is determined to be "YES" in the stop command sensing process S101 is represented.

(Timing T201)

On the side of the anode 2a, after the control device 6 has sensed a stop command, the target pressure control by the fuel injector 34 is performed in a state in which the in-tank electromagnetic valve 28 and the shutoff valve 33 have been opened and the pressure is increased so that the pressure of the anode 2a is set to the first predetermined pressure value P1 (S103A). Then, at the timing T201, the in-tank electromagnetic valve 28 and the shutoff valve 33 are closed at a point in time at which the pressure of the anode 2a has reached the first predetermined pressure value P1 (S103B).

(Timing T202)

At the timing T202, on the side of the anode 2a, the fuel off-gas circulation pump 30 is driven at a predetermined driving duty (the predetermined number of rotations) while the target pressure control by the fuel injector 34 continues so that the pressure of the anode 2a is set to the second predetermined pressure value P2 less than the first predetermined pressure value P1. At this time, in correspondence with the real number of rotations of the fuel off-gas circulation pump 30, the above-described discharge current control (see FIG. 4) or anode pressure control (see FIG. 5) is performed.

In addition, at the timing T202, on the side of the cathode 2b, each of the air pump 42 and the oxidant off-gas circulation pump 76 is driven a predetermined number of rotations in a state in which the pressure control valve 49 and the outlet sealing valve 48 have been closed and the inlet sealing valve 45 has been opened. Thereby, it is possible to consume oxygen remaining within the oxidant off-gas by circulating the oxidant off-gas within the cathode-side flow path 4 (the oxidant gas supply path 41, the oxidant flow path 46, the oxidant off-gas exhaust path 47, and the oxidant off-gas circulation path 75) while diluting hydrogen by supplying oxygen into the dilution box 40.

(Timing T203)

When the discharge of the fuel cell 2 is executed (S105A), a voltage of the fuel cell 2 is gradually decreased and a discharge current is generated at the timing T203. At this time, the target pressure control of the fuel injector 34 is performed, and the discharge of the fuel cell 2 is executed in a state in which the pressure of the anode 2a has been held to the second predetermined pressure value P2. In addition, the discharge of the fuel cell 2 is performed according to constant pressure control by a voltage controlled unit (VCU).

(Timing T204)

When the discharge ends at the timing T204 (S105B), the fuel off-gas circulation pump 30 stops on the side of the anode 2a, the target pressure control of the fuel injector 34 is continuously performed (S105C), and the pressure is increased so that the pressure of the anode 2a is set to the fourth predetermined pressure value P4 greater than the first predetermined pressure value P1 (S105C). On the side of the cathode 2b, the inlet sealing valve 45 is closed and the oxidant off-gas circulation pump 76 stops.

(From Timing T205)

After the pressure of the anode 2a has reached the fourth predetermined pressure value P4 (S105D), the stop process of the fuel cell system 1 is performed at the timing T205 (S107). On the side of the anode 2a, the supply of the fuel gas stops by closing the fuel injector 34. In addition, on the side of the cathode 2b, the air pump 42 stops. Thereby, the fuel cell system 1 stops in a state in which the pressure of the anode 2a has been kept to the fourth predetermined pressure value P4 according to pressure keeping. According to the above, the discharge control in the stop process of the fuel cell system 1 ends.

Advantageous Effects

According to this embodiment, it is possible to perform the stop-time discharge process S105 in a state in which a fuel gas has been sufficiently secured in the anode 2a because there are provided the anode pressure increasing process S103 of increasing the pressure so that the pressure of the anode 2a is set to the first predetermined pressure value P1 after the stop command has been sensed and the stop-time discharge process S105 of performing discharge by consuming oxygen remaining within an oxidant off-gas while driving the oxidant off-gas circulation pump 76 after the anode pressure increasing process S103. Thereby, even when a large current has been generated immediately after the stop-time discharge process S105 has been started, it is possible to prevent the lack of so-called anode stoichiometry (an amount of supply to the fuel cell 2/a theoretical amount of hydrogen consumption) and suppress electrode deterioration or the like. In addition, because oxygen remaining on the side of the cathode 2b of the fuel cell 2 can be consumed, the deterioration of the solid polymer electrolyte membrane 2c can be suppressed by suppressing a so-called crossover in which the oxidant gas is transmitted from the side of the cathode 2b to the side of the anode 2a. Therefore, the deterioration of the fuel cell 2 can be suppressed when the fuel cell system 1 stops.

In addition, because the stop-time discharge process S105 is performed by driving the fuel off-gas circulation pump 30, it is possible to cause oxygen within an oxidant off-gas of the side of the cathode 2b to react early by circulating the fuel off-gas within the fuel gas supply path 32, the fuel off-gas exhaust path 36, and the fuel off-gas circulation path 39 of the side of the anode 2a. Thereby, because oxygen of the side of the cathode 2b can be rapidly consumed, it is possible to end the stop-time discharge process S105 early. In addition, it is possible to improve the drainage of generation water staying on the side of the anode 2a by circulating a fuel off-gas of the side of the anode 2a. In addition, because the fuel off-gas is circulated and supplied, it is possible to suppress the deterioration of an electrode or the like by suppressing the lack of anode stoichiometry and improve the stability of discharge.

In addition, because the discharge continues while the adjustment is performed so that the pressure of the anode 2a is set to the second predetermined pressure value P2 less than the first predetermined pressure value P1, it is possible to perform the stop-time discharge process S105 by suppressing surplus supply of the fuel gas. Thereby, the deterioration of the solid polymer electrolyte membrane 2c can be suppressed by suppressing the crossover of the fuel gas from the side of the anode 2a to the side of the cathode 2b. Therefore, the deterioration of the fuel cell 2 can be suppressed when the fuel cell system 1 stops.

In addition, because the discharge continues while the adjustment is performed so that the pressure of the anode 2a is set to the third predetermined pressure value P3 greater than the second predetermined pressure value P2 when the fuel off-gas circulation pump 30 has failed, it is possible to suppress the lack of anode stoichiometry according to high pressure of the fuel gas and secure the stability of discharge even when the fuel off-gas circulation pump 30 has failed.

In addition, because the adjustment is performed so that the pressure of the anode 2a is set to the fourth predetermined pressure value P4 greater than the first predetermined pressure value P1 after the end of the discharge, the fuel gas can be kept in the anode 2a according to pressure keeping and the side of the anode 2a and the side of the cathode 2b can be in a hydrogen-rich state. Thereby, it is possible to prevent the side of the anode 2a and the side of the cathode 2b from being in an air-rich state and prevent the cathode 2b from being exposed to high potential at the start of the next time.

In addition, when the discharge has been shut off before the end of the discharge, unreacted oxygen is considered to remain on the side of the cathode 2b. On the other hand, according to this embodiment, because the stop-time discharge process S105 ends without performing adjustment so that the pressure of the anode 2a is set to the fourth predetermined pressure value P4 greater than the first predetermined pressure value P1, it is possible to reduce an amount of hydrogen which reacts with oxygen remaining on the side of the cathode 2b. Thereby, because it is possible to prevent the oxygen remaining on the side of the cathode 2b and hydrogen transmitted through the solid polymer electrolyte membrane and penetrating the side of the cathode 2b from locally reacting on the face of the solid polymer electrolyte membrane 2c, it is possible to prevent the deterioration of the fuel cell 2 due to the deterioration of the solid polymer electrolyte membrane 2c.

In addition, when the fuel off-gas circulation pump 30 fails and it is difficult to circulate the fuel off-gas, hydrogen is unlikely to be sufficiently supplied to the anode 2a. On the other hand, according to this embodiment, because a current value of the discharge is set to a fixed lower-limit current value (for example, 3 A) when the fuel off-gas circulation pump 30 fails, it is possible to suppress the deterioration of an electrode by suppressing the lack of anode stoichiometry. Therefore, the deterioration of the fuel cell 2 can be suppressed even when the fuel off-gas circulation pump 30 has failed.

In addition, because the current value of the discharge is determined in correspondence with the real number of rotations of the fuel off-gas circulation pump 30, the real number of rotations of the fuel off-gas circulation pump 30, that is, a discharge current corresponding to a supply amount of the fuel gas, can be generated. Therefore, for example, even when the fuel off-gas circulation pump 30 does not rotate according to a command value of the fuel cell system 1 due to the deterioration of the fuel off-gas circulation pump 30 or the like, the deterioration of the fuel cell 2 can be suppressed by suppressing the lack of anode stoichiometry.

In addition, because a pressure value of the anode 2a in the discharge is determined in correspondence with the real number of rotations of the fuel off-gas circulation pump 30, the pressure of the anode 2a can be adjusted by making up the fuel gas in correspondence with the real number of rotations of the fuel off-gas circulation pump 30. Therefore, for example, even when the fuel off-gas circulation pump 30 does not rotate according to a command value of the fuel cell system 1 due to the deterioration of the fuel off-gas circulation pump 30 or the like, the deterioration of the fuel cell 2 can be suppressed by suppressing the lack of anode stoichiometry.

In addition, because the discharge is performed by closing the purge valve 37 and the drain valve 38a in the stop-time discharge process S105, it is possible to prevent hydrogen from being exhausted outside the fuel cell system 1 through the purge valve 37 and the drain valve 38a. Therefore, the lack of anode stoichiometry by the external exhaust of the hydrogen can be prevented and ineffective hydrogen consumption can be suppressed. In addition, when the hydrogen is exhausted outside the fuel cell system 1, the dilution box 40 performs dilution by causing the hydrogen and oxygen to react. However, because the purge valve 37 and the drain valve 38a are closed according to this embodiment, it is possible to prevent a large amount of hydrogen from being introduced into the dilution box 40. Therefore, it is possible to easily dilute the hydrogen and exhaust the diluted hydrogen outside the fuel cell system 1.

In addition, by performing the stop-time discharge process S105 in a state in which the outlet sealing valve 48 has been closed, oxygen within each flow path of the oxidant gas supply path 41, the oxidant off-gas exhaust path 47, and the oxidant off-gas circulation path 75 which connects the oxidant gas supply path 41 and the oxidant off-gas exhaust path 47 can be rapidly consumed. Therefore, because the atmosphere of the cathode 2b can rapidly become nitrogen-rich, the deterioration of the fuel cell 2 can be further suppressed.

The technical scope of the present invention is not limited to the aforementioned embodiment, and it is possible to add various alterations without departing from the spirit or scope of the present invention.

For example, although the high-voltage battery 11 is adopted as a storage unit in the embodiment, the present invention is not limited thereto and, for example, a capacitor or the like may be adopted.

In addition, although an example in which the fuel cell system 1 is mounted on the fuel cell vehicle has been described in the embodiment, the application of the method of controlling the fuel cell system 1 of the present invention is not limited to the case in which the fuel cell system 1 is mounted on the fuel cell vehicle.

Although the discharge of the fuel cell 2 is performed in a state in which the inlet sealing valve 45 has been opened and the outlet sealing valve 48 has been closed, the discharge of the fuel cell 2 may be performed in a state in which the inlet sealing valve 45 and the outlet sealing valve 48 have been closed.

Although the discharge current control for determining a current value of discharge in correspondence with the real number of rotations of the fuel off-gas circulation pump 30 is performed in the stop-time discharge process S105, anode pressure control for determining the pressure of the anode 2a may be performed in correspondence with the real number of rotations of the fuel off-gas circulation pump 30. In addition, in the stop-time discharge process S105, the discharge current control and the anode pressure control may be used together.

Although one fuel injector 34 is provided on the anode-side flow path 3 in the embodiment, a plurality of fuel injectors may be provided. In addition, although the target pressure control by one fuel injector 34 is performed in the anode pressure increasing process S103, the stop-time discharge process S105, or the like, the target pressure control may also be performed using the plurality of fuel injectors.

Additions, omissions, substitutions, and other modifications can be made to the above-described embodiment without departing from the scope of the present invention.

What is claimed is:

1. A method of controlling a fuel cell system, wherein the fuel COD system comprises:
    a fuel cell which generates power by supplying a fuel gas to an anode and supplying an oxidant gas to a cathode;
    a fuel gas supply path through which the fuel gas supplied to the anode flows;
    a fuel off-gas exhaust path through which a fuel off-gas exhausted from the anode flows;
    an oxidant gas supply path through which the oxidant gas supplied to the cathode flows;
    an oxidant off-gas exhaust path through which an oxidant off-gas exhausted from the cathode flows;
    an oxidant off-gas circulation path which connects the oxidant gas supply path and the oxidant off-gas exhaust path;
    an oxidant gas supply unit which supplies the oxidant gas to the cathode;
    an oxidant off-gas circulation unit which is arranged on the oxidant off-gas circulation path and circulates the oxidant off-gas;
    a fuel off-gas circulation path which connects the fuel gas supply path and the fuel off-gas exhaust path; and
    a fuel off-gas circulation unit which is arranged on the fuel off-gas circulation path and circulates the fuel off-gas,
    wherein the method of controlling the fuel cell system comprises:
    a stop command sensing process of sensing a stop command output when the fuel cell system stops;
    an anode pressure increasing process of increasing pressure so that pressure of the anode reaches a first predetermined pressure value after the stop command has been sensed in the stop command sensing process; and
    a stop-time discharge process of performing discharge by consuming oxygen remaining within the oxidant off-gas while driving the oxidant off-gas circulation unit after the anode pressure increasing process,
    wherein in the stop-time discharge process, the discharge continues while adjustment is performed so that the pressure of the anode is set to a second predetermined pressure value less than the first predetermined pressure value and a current value of the discharge is determined in correspondence with the real number of rotations of the fuel off-gas circulation unit, and wherein the stop-time discharge process is performed by driving the fuel off-gas circulation unit.

2. The method according to claim 1, wherein, when the fuel off-gas circulation unit has failed in the stop-time discharge process, the discharge continues while adjustment is performed so that the pressure of the anode is set to a third predetermined pressure value greater than the second predetermined pressure value.

3. The method according to claim 1, wherein, in the stop-time discharge process, adjustment is performed to set the pressure of the anode to a fourth predetermined pressure value greater than the first predetermined pressure value after an end of the discharge.

4. The method according to claim 3, wherein, when the discharge has been shut off before the end of the discharge, the stop-time discharge process ends without the adjustment of setting the pressure of the anode to the fourth predetermined pressure value.

5. The method according to claim 1, wherein, when the fuel off-gas circulation unit fails and it is difficult to circulate the fuel off-gas, a current value of the discharge is set to a fixed lower-limit current value in the stop-time discharge process.

6. A method of controlling a fuel cell system, wherein the fuel cell system comprises:
    a fuel cell which generates power by supplying a fuel gas to an anode and supplying an oxidant gas to a cathode;
    a fuel gas supply path through which the fuel gas supplied to the anode flows;
    a fuel off-gas exhaust path through which a fuel off-gas exhausted from the anode flows;
    an oxidant gas supply path through which the oxidant gas supplied to the cathode flows;
    an oxidant off-gas exhaust path through which an oxidant off-gas exhausted from the cathode flows;
    an oxidant off-gas circulation path which connects the oxidant gas supply path and the oxidant off-gas exhaust path;
    an oxidant gas supply unit which supplies the oxidant gas to the cathode;
    an oxidant off-gas circulation unit which is arranged on the oxidant off-gas circulation path and circulates the oxidant off-gas;
    a fuel off-gas circulation path which connects the fuel gas supply path and the fuel off-gas exhaust path; and
    a fuel off-gas circulation unit which is arranged on the fuel off-gas circulation path and circulates the fuel off-gas,
    wherein the method of controlling the fuel cell system comprises:
    a stop command sensing process of sensing a stop command output when the fuel cell system stops;
    an anode pressure increasing process of increasing pressure so that pressure of the anode reaches a first predetermined pressure value after the stop command has been sensed in the stop command sensing process; and a stop-time discharge process of performing discharge by consuming oxygen remaining within the oxidant off-gas while driving the oxidant off-gas circulation unit after the anode pressure increasing process, wherein in the stop-time discharge process the discharge continues while adjustment is performed so that the pressure of the anode is set to a second predetermined pressure value less than the first predetermined pressure value and a pressure value of the anode in the discharge is determined in correspondence with the real number of rotations of the fuel off-gas circulation unit, and wherein the stop time discharge process is performed by driving the fuel off-gas circulation unit.

7. The method according to claim 1, wherein the fuel cell system further includes:

an exhaust valve for exhausting the fuel off-gas;

a gas-liquid separator which is arranged on the fuel off-gas exhaust path and separates the fuel off-gas and liquid mixed inside the fuel off-gas to store the liquid; and a drain valve for draining the liquid stored inside the gas-liquid separator, and wherein, in the stop-time discharge process, the discharge is performed by closing the exhaust valve and the drain valve.

8. The method according to claim 1, wherein the fuel cell system further includes:

a first sealing valve arranged on an upstream side of a flow direction of the oxidant gas rather than a connection portion with the oxidant off-gas circulation path in the oxidant gas supply path; and a second sealing valve arranged on a downstream side of a flow direction of the oxidant off-gas rather than the connection portion with the oxidant off-gas circulation path in the oxidant off-gas exhaust path, and wherein at least the second sealing valve is closed in the stop-time discharge process.

* * * * *